United States Patent
Tian et al.

(10) Patent No.: US 9,681,407 B2
(45) Date of Patent: Jun. 13, 2017

(54) TIME SYNCHRONIZATION FUNCTION ROLLOVER SOLUTION

(71) Applicant: QUALCOMM Incorporated, San Diego, CA (US)

(72) Inventors: Bin Tian, San Diego, CA (US); Alfred Asterjadhi, San Diego, CA (US); Amin Jafarian, San Diego, CA (US); Santosh Paul Abraham, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 14/581,980

(22) Filed: Dec. 23, 2014

(65) Prior Publication Data
US 2015/0189614 A1 Jul. 2, 2015

Related U.S. Application Data

(60) Provisional application No. 61/921,406, filed on Dec. 28, 2013.

(51) Int. Cl.
*H04W 56/00* (2009.01)
*H04B 7/0413* (2017.01)
*H04L 29/06* (2006.01)
*H04B 7/26* (2006.01)

(52) U.S. Cl.
CPC ...... *H04W 56/0015* (2013.01); *H04B 7/0413* (2013.01); *H04B 7/2681* (2013.01); *H04L 69/22* (2013.01)

(58) Field of Classification Search
CPC .................................................. H04W 56/0015
See application file for complete search history.

(56) References Cited

U.S. PATENT DOCUMENTS

| | | | | |
|---|---|---|---|---|
| 5,515,373 A | * | 5/1996 | Lynch | H04M 11/06 370/465 |
| 6,108,303 A | * | 8/2000 | Fahmi | H04L 12/5602 370/230 |
| 7,583,695 B2 | * | 9/2009 | Vimpari | H04L 69/08 370/392 |

(Continued)

FOREIGN PATENT DOCUMENTS

WO WO-2013052077 A1 4/2013

OTHER PUBLICATIONS

International Search Report and Written Opinion—PCT/US2014/072407—ISA/EPO—Apr. 7, 2015.

*Primary Examiner* — Parth Patel
(74) *Attorney, Agent, or Firm* — Patterson & Sheridan

(57) ABSTRACT

Aspects of the present disclosure provide apparatus, methods, processing systems, and computer program products for time synchronization function (TSF) rollover solutions for short beacons. Aspects of the present disclosure provide an apparatus for wireless communications. The apparatus generally includes a processing system configured to generate a time stamp with a first value of a first portion of a counter and generate a frame including a first field with the time stamp and a second field having one or more bits with a second value of the first portion of the counter, and an interface configured to output the frame for transmission to a receiving device.

55 Claims, 9 Drawing Sheets

(56) References Cited

U.S. PATENT DOCUMENTS

| | | | | |
|---|---|---|---|---|
| 8,036,152 B2* | 10/2011 | Brown | H04W 52/0216 | 370/311 |
| 8,295,218 B2* | 10/2012 | Imamura | H04W 52/0216 | 340/539.3 |
| 8,428,045 B2* | 4/2013 | Gelter | H04L 49/90 | 370/350 |
| 9,191,225 B2* | 11/2015 | Martin | H04L 12/2602 | |
| 2002/0065940 A1* | 5/2002 | Suzuki | H04J 3/0664 | 709/248 |
| 2003/0007484 A1* | 1/2003 | Beshai | H04Q 11/0005 | 370/370 |
| 2003/0206538 A1* | 11/2003 | Rezaiifar | H04L 9/12 | 370/335 |
| 2004/0034722 A1* | 2/2004 | Saito | H04L 69/14 | 710/5 |
| 2005/0141478 A1* | 6/2005 | Ho | H04J 3/0655 | 370/350 |
| 2005/0286480 A1* | 12/2005 | Akiyama | H04W 76/02 | 370/338 |
| 2006/0034279 A1* | 2/2006 | Cho | H04B 7/0617 | 370/390 |
| 2007/0025486 A1* | 2/2007 | Gainey | H04B 7/2606 | 375/356 |
| 2007/0127427 A1* | 6/2007 | Tanaka | H04W 48/16 | 370/338 |
| 2007/0255847 A1* | 11/2007 | Smith | H04L 12/00 | 709/231 |
| 2008/0044014 A1* | 2/2008 | Corndorf | H04L 63/12 | 380/37 |
| 2008/0187007 A1* | 8/2008 | Goyal | G06F 17/30174 | 370/503 |
| 2008/0205568 A1* | 8/2008 | Oyama | H04B 7/2643 | 375/365 |
| 2009/0003307 A1* | 1/2009 | Yang | H04W 72/1215 | 370/350 |
| 2010/0034212 A1* | 2/2010 | Yavuz | H04L 12/5693 | 370/412 |
| 2010/0302969 A1* | 12/2010 | Duenyas | H04W 72/082 | 370/252 |
| 2011/0216082 A1* | 9/2011 | Caskey | G06F 3/1446 | 345/560 |
| 2011/0265152 A1* | 10/2011 | Kestenbaum | G06F 3/14 | 726/5 |
| 2012/0158990 A1* | 6/2012 | Losio | H04Q 11/04 | 709/236 |
| 2013/0070751 A1 | 3/2013 | Atwal et al. | | |
| 2013/0142124 A1* | 6/2013 | Abraham | H04W 28/06 | 370/328 |
| 2013/0148639 A1* | 6/2013 | Gao | H04J 3/0641 | 370/336 |
| 2013/0343365 A1* | 12/2013 | Hollabaugh | H04W 56/00 | 370/338 |
| 2014/0247786 A1* | 9/2014 | Izu | H04L 29/0653 | 370/329 |
| 2014/0295762 A1* | 10/2014 | Jung | H04W 48/16 | 455/41.2 |
| 2015/0098459 A1* | 4/2015 | Lee | H04W 48/16 | 370/338 |
| 2015/0131628 A1* | 5/2015 | Chu | H04W 56/0015 | 370/336 |
| 2015/0156524 A1* | 6/2015 | Morotomi | H04N 21/242 | 725/116 |
| 2015/0244619 A1* | 8/2015 | Zheng | H03M 13/09 | 370/392 |
| 2015/0358966 A1* | 12/2015 | Zheng | H04W 72/0446 | 370/329 |

* cited by examiner

| B0 | B1 | B2 | B3 | B4 | B5 | B6 | B7 |
|---|---|---|---|---|---|---|---|
| ESS | IBSS | CF Pollable | CF-Poll Request | Privacy | Short Preamble | Reserved | Reserved |

| B8 | B9 | B10 | B11 | B12 | B13 | B14 | B15 |
|---|---|---|---|---|---|---|---|
| Spectrum Management | QoS | Short Slot Time | APSD | Radio Measurement | TSF Rollover Flag | Delayed Block Ack | Immediate Block Ack |

900 (arrow to first table)
914 (pointing to TSF Rollover Flag)

FIG. 9

TIME SYNCHRONIZATION FUNCTION ROLLOVER SOLUTION

CROSS-REFERENCE TO RELATED APPLICATION(S)

This application claims benefit of U.S. Provisional Patent Application Ser. No. 61/921,406, filed Dec. 28, 2013, which is herein incorporated by reference in its entirety.

BACKGROUND

Field of the Disclosure

Certain aspects of the present disclosure generally relate to wireless communications and, more particularly, to time synchronization function (TSF) timer rollover for frames (e.g., Short Beacons, Probe Response, S1G Beacons) that carry portions of the TSF timer in one or more fields (e.g., a timestamp field and a Short Beacon Compatibility element or S1G Beacon Compatibility element).

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than wireless ranges associated with frequency ranges of other IEEE 802.11 technologies and potentially fewer issues associated with path losses due to obstructions.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure provide apparatus, methods, processing systems, and computer program products for time synchronization function (TSF) rollover for frames (e.g., S1G Beacon frames) that carry portions of the TSF timer in one or more fields (e.g., in a timestamp field and in an S1G Beacon Compatibility element).

Certain aspects of the present disclosure provide an apparatus for wireless communications. The apparatus generally includes a processing system configured to generate a time stamp with a first value of a first portion of a counter and generate a frame including a first field with the time stamp and a second field having one or more bits with a second value of the first portion of the counter and an interface configured to output the frame for transmission to a receiving device.

Certain aspects of the present disclosure provide an apparatus for wireless communications. The apparatus generally includes an interface configured to receive a frame from a transmitting device and a processing system configured to obtain, from the frame, a first field with a time stamp with a first value of a first portion of a counter and a second field having one or more bits with a second value of the first portion of the counter, and determine, based on the time stamp and the one or more bits, whether the first value of the first portion of the counter has changed since the time stamp was obtained.

Certain aspects of the present disclosure provide a method for wireless communications. The method generally includes generating a time stamp with a first value of a first portion of a counter, generating a frame including a first field with the time stamp and a second field having one or more bits with a second value of the first portion of the counter, and outputting the frame for transmission to a receiving device.

Certain aspects of the present disclosure provide a method for wireless communications. The method generally includes receiving a frame from a transmitting device, obtaining, from the frame, a first field with a time stamp with a first value of a first portion of a counter and a second field having one or more bits with a second value of the first portion of the counter, and determining, based on the time stamp and the one or more bits, whether the first value of the first portion of the counter has changed since the time stamp was obtained.

Certain aspects of the present disclosure provide an apparatus for wireless communications. The apparatus generally includes means for generating a time stamp with a first value of a first portion of a counter, means for generating a frame including a first field with the time stamp and a second field having one or more bits with a second value of the first portion of the counter, and means for outputting the frame for transmission to a receiving device.

Certain aspects of the present disclosure provide an apparatus for wireless communications. The apparatus generally includes means for receiving a frame from a transmitting device, means for obtaining, from the frame, a first field with a time stamp with a first value of a first portion of a counter and a second field having one or more bits with a second value of the first portion of the counter, and means for determining, based on the time stamp and the one or more bits, whether the first value of the first portion of the counter has changed since the time stamp was obtained.

Certain aspects of the present disclosure provide a computer program product for wireless communications. The computer program product generally includes a computer readable medium having instructions stored thereon for generating a time stamp with a first value of a first portion of a counter, generating a frame including a first field with the time stamp and a second field having one or more bits with a second value of the first portion of the counter, and outputting the frame for transmission to a receiving device Certain aspects of the present disclosure provide a computer program product for wireless communications. The computer program product generally includes a computer readable medium having instructions stored thereon for receiving a frame from a transmitting device, obtaining, from the frame, a first field with a time stamp with a first value of a first portion of a counter and a second field having one or more bits with a second value of the first portion of the counter, and determining, based on the time stamp and the one or more bits, whether the first value of the first portion of the counter has changed since the time stamp was obtained.

Certain aspects of the present disclosure provide an access point. The access point generally includes at least one antenna, a processing system configured to generate a time stamp with a first value of a first portion of a counter and generate a frame including a first field with the time stamp and a second field having one or more bits with a second value of the first portion of the counter, and transmitter configured to output the frame for transmission, via the at least one antenna, to a receiving device.

Certain aspects of the present disclosure provide a wireless station. The wireless station generally includes at least one antenna, a receiver configured to receive, via the at least one antenna, a frame from a transmitting device and a processing system configured to obtain, from the frame, a first field with a time stamp with a first value of a first portion of a counter and a second field having one or more bits with a second value of the first portion of the counter, and determine, based on the time stamp and the one or more bits, whether the first value of the first portion of the counter has changed since the time stamp was obtained.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 illustrates an example TSF Rollover subfield included in the Capability Information field of a Short Beacon Compatibility element in a Short Beacon frame, in accordance with certain aspects of the present disclosure.

DETAILED DESCRIPTION

Figure 1:
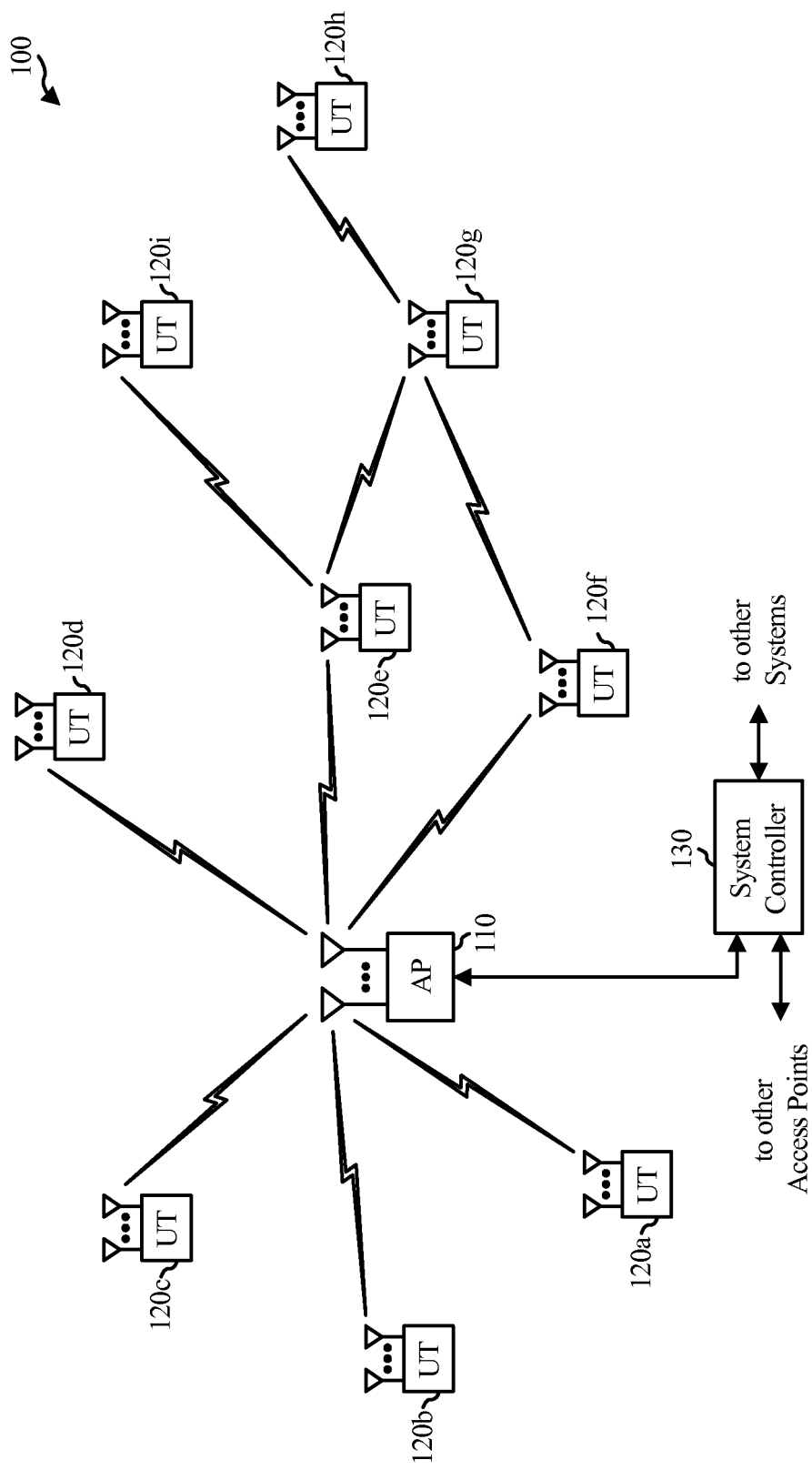
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure provide apparatus, methods, processing systems, and computer program products for time synchronization function (TSF) rollover for frames, such as S1G Beacon frames, that carry portions of the TSF timer in one or more fields (e.g., in a timestamp field and Short Beacon Compatibility element or S1G Beacon Compatibility element).

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT is a wireless node. Such wireless node may provide, for example, connectivity for or to a network (e.g., a wide area network such as the Internet or a cellular network) via a wired or wireless communication link.

An Example Wireless Communications System

FIG. 1 illustrates an example wireless communication system in which aspects of the present disclosure may be practiced. For example, AP 110 may be configured to generate a time stamp with a first value of a first portion of a counter, to be used for synchronizing timing between the AP and a UT 120. AP 110 may be configured to transmit a frame to the UT 120 including a first field with the time stamp and a second field having one or more bits with a second value of the first portion of the counter. UT 120 may be configured to determine, based on the time stamp and the one or more bits, whether the first value of the first portion of the counter has changed since the time stamp was obtained.

The system illustrated in FIG. 1 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The MIMO system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The MIMO system 100 may also be a TDMA system if the user terminals 120 share the same frequency channel by dividing transmission/reception into different time slots, each time slot being assigned to different user terminal 120.

Figure 2:
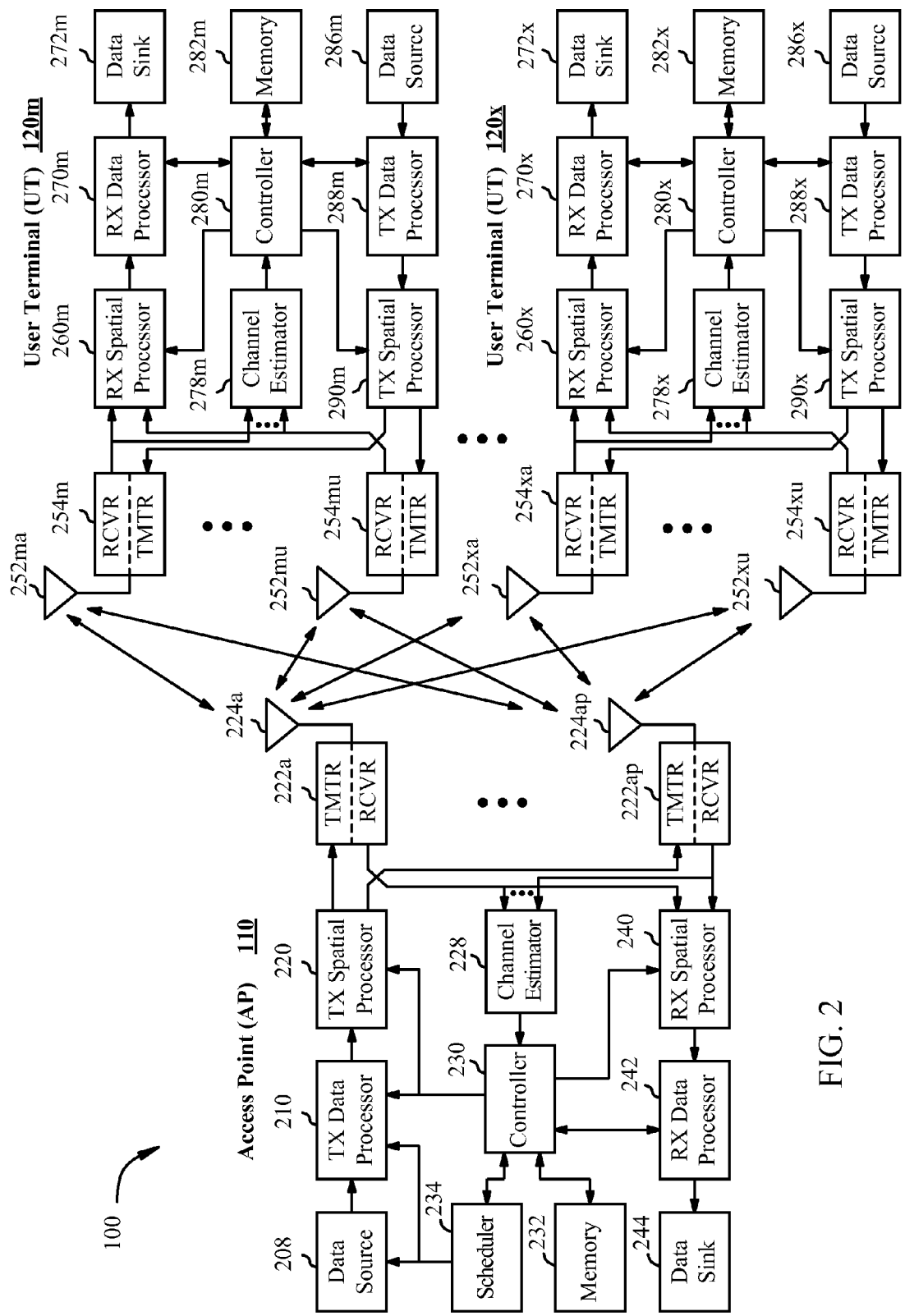
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 may be used to perform the operations described herein and illustrated with reference to FIGS. 6 and 6A. Similarly, antenna 252, Tx/Rx 254, processors 260, 270, 288, and 290, and/or controller 280 may be used to perform the operations described herein and illustrated with reference to FIGS. 7 and 7A.

FIG. 2 illustrates a block diagram of access point 110 and two user terminals 120$m$ and 120$x$ in MIMO system 100. The access point 110 is equipped with N$_t$ antennas 224$a$ through 224$ap$. User terminal 120$m$ is equipped with N$_{ut,m}$ antennas 252$ma$ through 252$mu$, and user terminal 120$x$ is equipped with N$_{ut,x}$ antennas 252$xa$ through 252$xu$. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, N$_{up}$ user terminals are selected for simultaneous transmission on the uplink, N$_{dn}$ user terminals are selected for simultaneous transmission on the downlink, N$_{up}$ may or may not be equal to N$_{dn}$, and N$_{up}$ and N$_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides N$_{ut,m}$ transmit symbol streams for the N$_{ut,m}$ antennas. Each transmitter unit (TMTR) 254 receives and processes (e.g., converts to analog, amplifies, filters, and frequency upconverts) a respective transmit symbol stream to generate an uplink signal. N$_{ut,m}$ transmitter units 254 provide N$_{ut,m}$ uplink signals for transmission from N$_{ut,m}$ antennas 252 to the access point.

N$_{up}$ user terminals may be scheduled for simultaneous transmission on the uplink. Each of these user terminals performs spatial processing on its data symbol stream and transmits its set of transmit symbol streams on the uplink to the access point.

At access point 110, N$_{ap}$ antennas 224$a$ through 224$ap$ receive the uplink signals from all N$_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the N$_{ap}$ received symbol streams from N$_{ap}$ receiver units 222 and provides N$_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for N$_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides N$_{dn}$ downlink data symbol streams for the N$_{dn}$ user terminals. A TX spatial processor 220 performs spatial processing (such as a precoding or beamforming, as described in the present disclosure) on the N$_{dn}$ downlink data symbol streams, and provides N$_{ap}$ transmit symbol streams for the N$_{ap}$ antennas. Each transmitter unit 222 receives and processes a respective transmit symbol stream to generate a downlink signal. N$_{ap}$ transmitter units 222 providing N$_{ap}$ downlink signals for transmission from N$_{ap}$ antennas 224 to the user terminals. The decoded data for each user terminal may be provided to a data sink 272 for storage and/or a controller 280 for further processing.

At each user terminal 120, N$_{ut,m}$ antennas 252 receive the N$_{ap}$ downlink signals from access point 110. Each receiver unit 254 processes a received signal from an associated antenna 252 and provides a received symbol stream. An RX spatial processor 260 performs receiver spatial processing on N$_{ut,m}$ received symbol streams from N$_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 120, a channel estimator 228 estimates the uplink channel response and provides uplink channel estimates. Controller 280 for each user terminal typically derives the spatial filter matrix for the user terminal based on the downlink channel response matrix H$_{dn,m}$ for that user terminal Controller 230 derives the spatial filter matrix for the access point based on the effective uplink channel response matrix H$_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
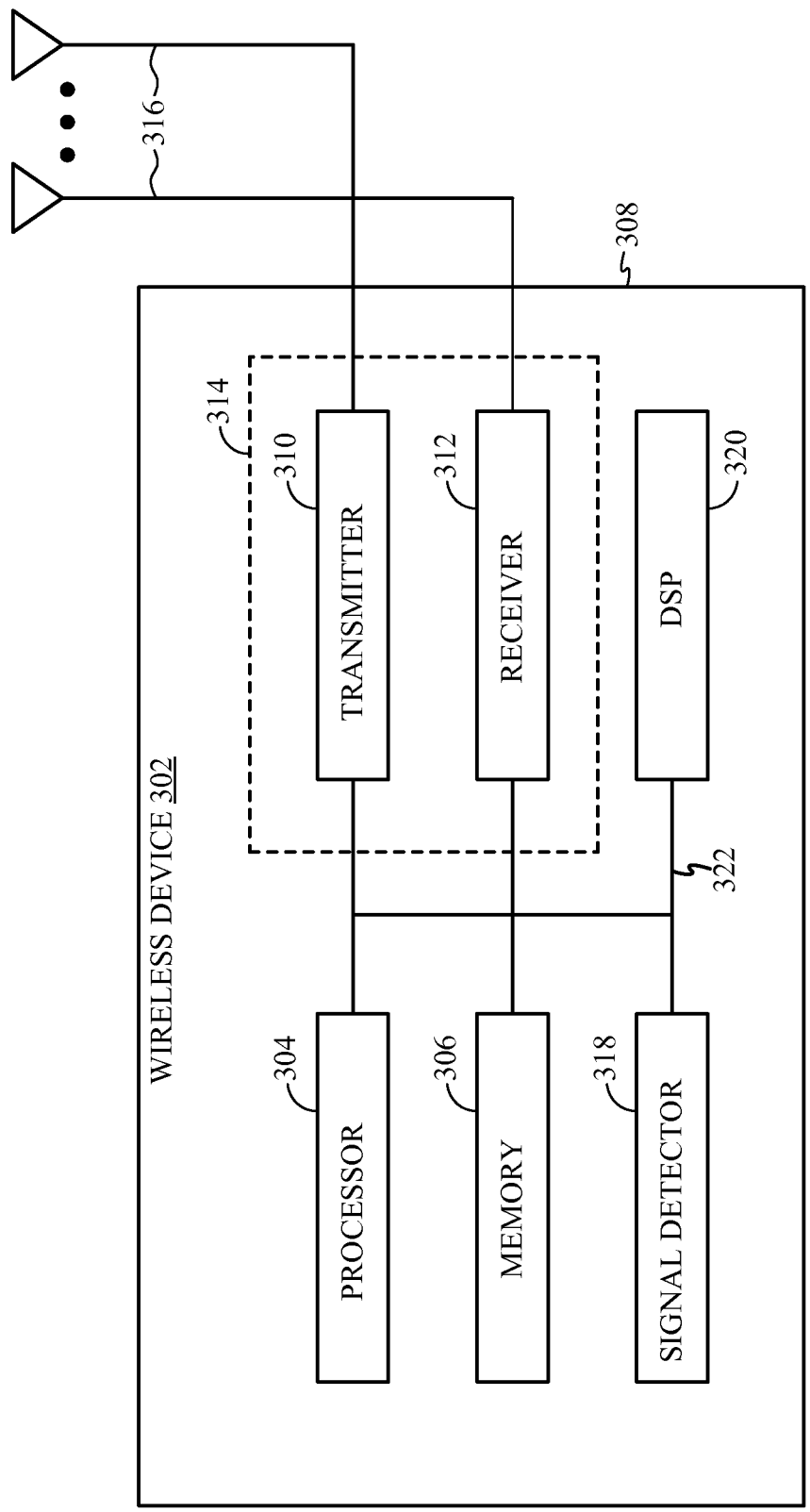
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example TSF Timer Rollover Solutions

In certain systems a Time Synchronization Function (TSF) timer (e.g., IEEE 802.11 long term evolution (LTE) systems) may be used to synchronize devices (e.g., stations (STAs)), for example, within a basic service set (BSS). For example, a TSF timer may be used to synchronize user terminals (e.g., such as user terminals 120) communicating with an access point (AP) (e.g., such as AP 110). Each STA (e.g., within the BSS) may maintain a local TSF timer. The TSF timer (e.g., counter) may be indicated as an 8-byte (e.g., 64 bit) value, which may be set by Medium Access Control (MAC) hardware. Timing synchronization can be achieved by the STAs periodically exchanging timing information, for example, using Beacon frames. Upon receiving a Beacon frame with timing information, the STA updates its local TSF timer to the timestamp of the beacon if the value of the timestamp is later than the STAs TSF timer.

In an example of synchronization using the TSF timer, the AP can set a Timestamp value in a Beacon frame to the value of its TSF timer. A user terminal receiving the Beacon frame from its associated AP synchronizes its TSF time (e.g., using MAC hardware) to the value of the Timestamp field in the received Beacon frame. The received Timestamp value is adjusted by adding an amount equal to the receiving user terminal's delay through its local PHY components plus the time since the first bit of the Timestamp field was received at the MAC/PHY interface.

The synchronization procedures described herein apply in general to all frames that include a field that contain a value of one or more portions of the TSF timer of the STA generating the frame, such as Short Beacons (which may also be referred to as S1G Beacon frames) or Short Probe Responses.

Figure 4:
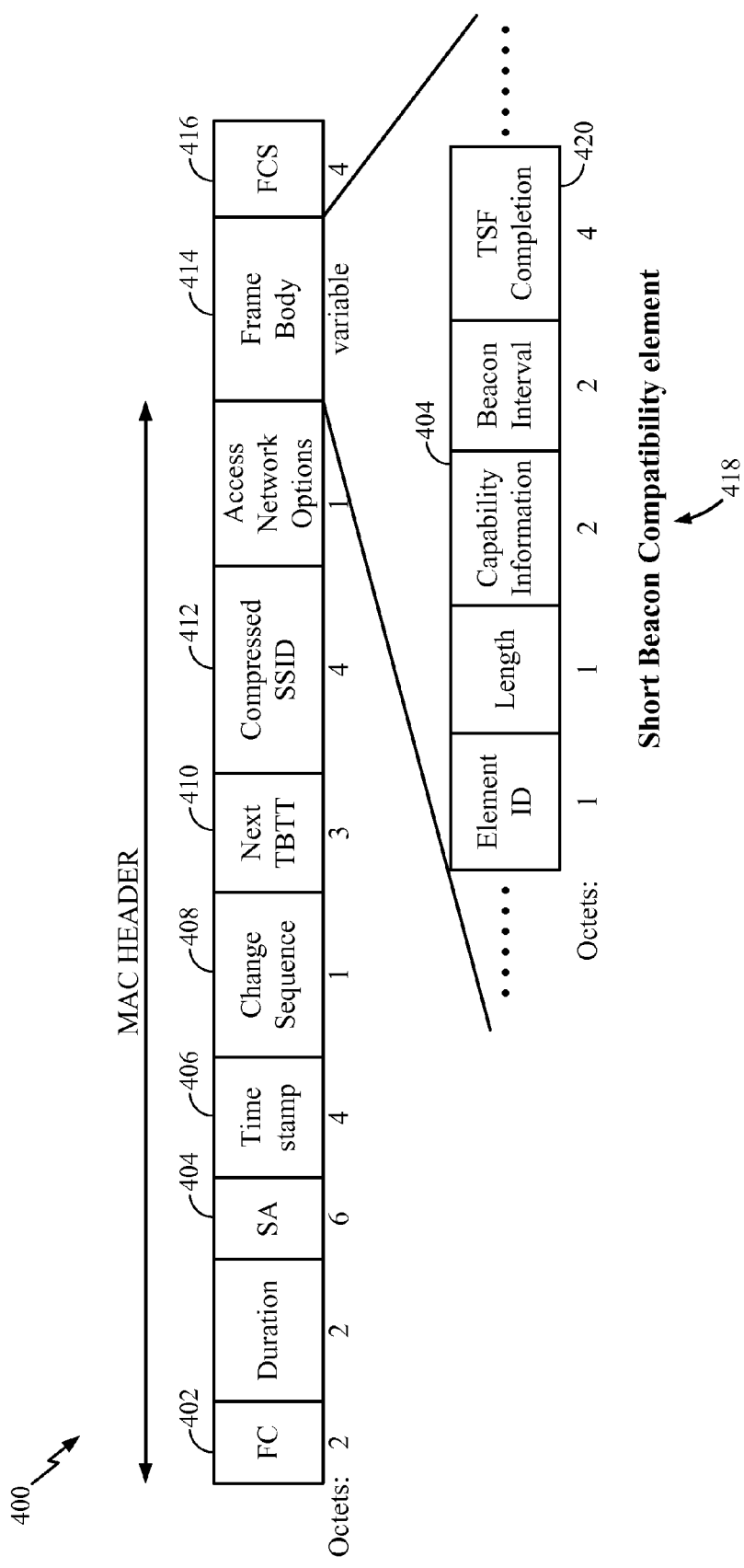
FIG. 4 illustrates an example prior art Short Beacon frame format with 4-byte Time Stamp field and 4-byte TSF Completion field.

FIG. 4 illustrates an example prior art Short Beacon frame 400 format that can be used for time synchronization between devices. As shown in FIG. 4, the MAC header of the Short Beacon frame 400 format includes a 2-byte (8 bit octets) Frame Control (FC) field 402, a 6-byte SA field 404, a 4-byte Time Stamp field 406, a 1-byte Change Sequence field 408, a 3-byte Next TBTT field 410, and a 4-byte Compressed SSID field 412. The Short Beacon frame 400 also includes a Frame Body 414 and Frame Check Sequence (FCS) 416. A Short Beacon Compatibility element 418 (also referred to as an S1G Compatibility element) is included in the Frame Body 414. In the example Short Beacon frame 400 format shown in FIG. 4, the Short Beacon Compatibility element 418 is located in the last field preceding the FCS field 416 in the Short Beacon frame 400 format (in the Frame Body 414). However, although not shown in FIG. 4, the Short Beacon Compatibility element 418 can be included in different locations of the Frame Body 414. As shown in FIG. 4, the Short Beacon Compatibility element 418 includes a 4-byte TSF Completion field 420. The Short Beacon frame can be in general an S1G Beacon frame and the Short Beacon Compatibility element can be in general an S1G Compatibility element.

The SA field 404 is the address of the STA transmitting the Short Beacon frame 400. The Change Sequence field 408 is defined as an unsigned integer initialized to 0, that increments when a critical update to the Short Beacon frame 400 has occurred. The Next TBTT field 410 is optionally present and indicates the most significant 3 bytes of the 4 least significant bytes of the next TBTT. The Compressed SSID field 412 is optionally present and indicates a 32-bit cyclic redundancy check (CRC). An Access Network Option field is also optionally present. The 2-byte Duration field sets the duration, in microseconds.

The 4-byte Time Stamp field 406 (e.g., which may not be an IE) includes the four least significant bytes (LSBs) of the 8-byte TSF timer of the device transmitting the Short Beacon frame 400, for example, at the time that the start of the date symbol, containing the first bit of the Timestamp, is transmitted by the PHY plus the processing delay of the transmitting device through its local PHY from the MAC-PHY interface to its interface with the wireless medium. The remaining four most significant bytes (MSBs) (which may also be referred to as octets) of the TSF timer of the device transmitting the Short Beacon frame are included in the Short Beacon Compatibility element 418, for example, in the 4-byte TSF Completion field 420. The values of the MSBs included in the TSF Completion field 420 are the values of the four most significant octets of the TSF timer at the time of generation of the element carrying the TSF Completion Field 420—in this example, the Short Beacon Compatibility element 418. Thus, the four LSBs of the TSF timer may be located in the MAC header of the Short Beacon and the four MSBs may be located in the Frame Body of the Short Beacon and are, therefore, generated at different instances of time by the STA transmitting the Short Beacon frame 400.

This separation of the LSBs and MSBs of the TSF timer may lead to problems when a rollover of the TSF occurs (e.g., when the value of the TSF timer reaches a maximum value and restarts from zero) between the instance of time the TSF timer is generated and the instance of time the LSBs and MSBs of the TSF timer are generated and included in the Short Beacon frame prior to transmission. For example, the LSBs of the TSF timer are generated at T2 and included in the MAC header and, subsequently, the MSBs of the TSF timer are generated at T1 and included in the Frame Body (with T2 in general being greater than or equal to T1.

At target beacon transmission time (TBTT), the Short Beacon frame 400 may be transmitted with 4-byte Time Stamp field 406 (i.e., the four LSBs of the TSF timer) in the MAC header and the 4-byte TSF Completion field 420 (i.e., the four MSBs of the TSF timer) in the Short Beacon Compatibility element 418 located in the Frame Body 414. At TSBTT, a short Beacon with 4-byte Timestamp (i.e., the four LSBs of TSF time), that is not IE, is transmitted.

When the Timestamp is received in the Short Beacon frame 400 (e.g., at approximately time T2+DELTA due to processing delays), the STA receiving the Short Beacon frame 400 sets its TSF timer (e.g., the four LSBs) based on the value of the Time Stamp field 406 (which is adjusted by adding an amount equal to the receiving STA's delay through its local PHY components plus the time since the first bit of the Time Stamp field 406 was received at the MAC/PHY interface). When the TSF Completion field 420 is included in the Short Beacon frame 400 (e.g., and received at approximately time T1), the STA receiving the Short Beacon frame 400 sets the four MSBs of its TSF timer to the value of the TSF Completion field 420 in the Short Beacon Compatibility element 418. However, during the setting period (period of time that is greater than or equal to T2+DELTA−T1), the four LSBs of the TSF timer may have changed (e.g., from ffffffff to 00000000), for example, due to generation and/or processing delays at the transmitter or the receiver (e.g., for example delay in sending/receiving from PHY to MAC layer).

Figure 5:
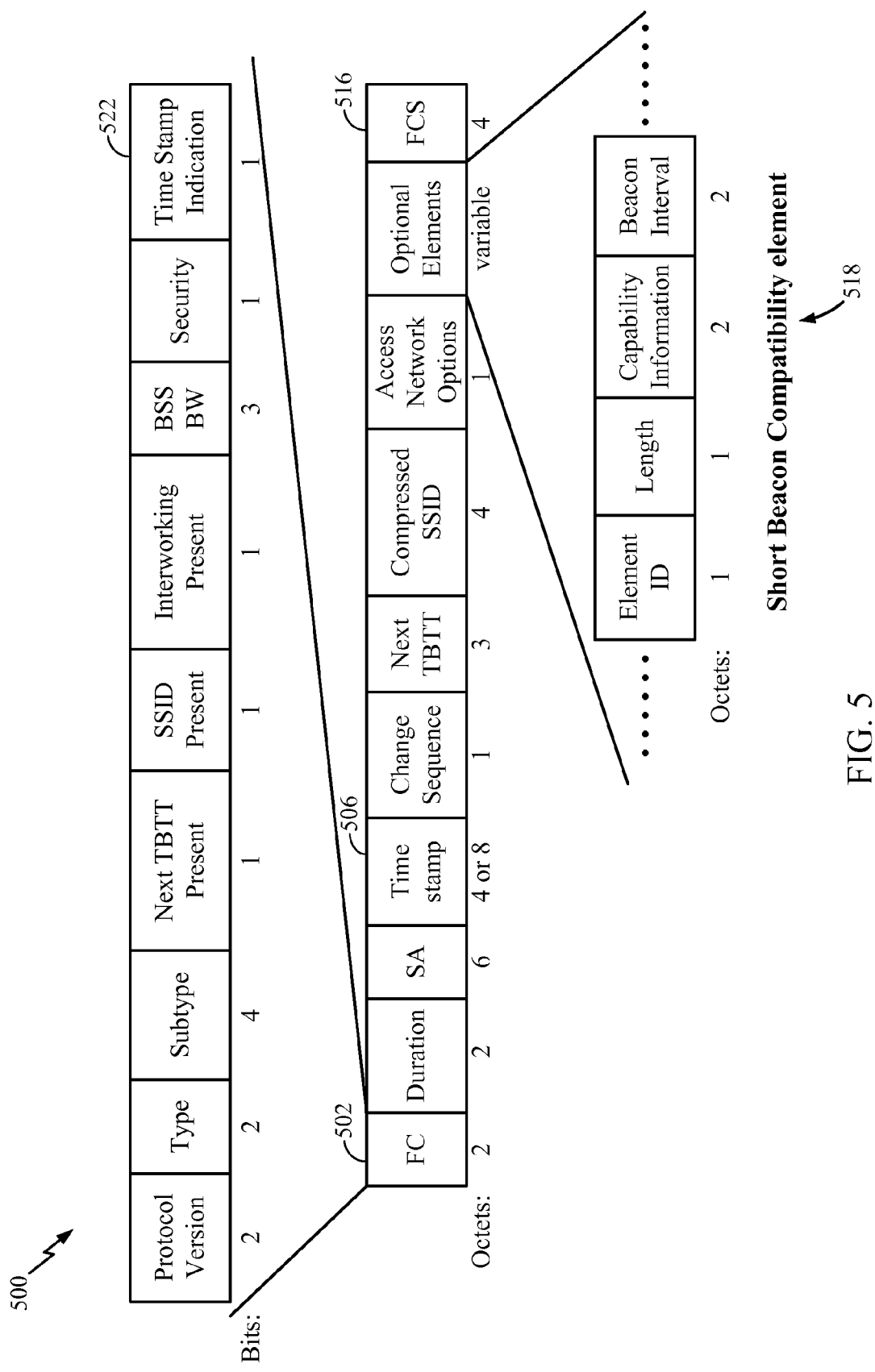
FIG. 5 illustrates an example prior art Short Beacon frame format with 4- or 8-byte Time Stamp field.

FIG. 5 illustrates an example prior art Short Beacon frame 500 format. As shown in FIG. 5, in one conventional solution to the rollover problem, all 8-bytes of the TSF timer are included in an 8-byte Time Stamp field 506. In this case, the Short Beacon frame 500 includes a bit in the FC field 502 to indicate different TSF field formats. For example, one bit in the Time Stamp Indication subfield 522 (e.g., bit 15) is used to indicate whether the Time Stamp field 506 includes a 4-byte LSB TSF time or the entire 8-bytes of the TSF timer. Since the entire TSF timer can be included in the Time Stamp field 506, the TSF Completion field is deleted from the Short Beacon Compatibility element 518. At TBTT, a Short Beacon with the 8-byte Timestamp (i.e., the entire TSF timer) may be transmitted and at TSBTT, a Short Beacon with the 4-byte Timestamp (i.e., four LSBs of TSF timer) may be transmitted. 4-byte or 8-byte Timestamp field may be prepared by AP MAC hardware. The STA may set its TSF time per the 4-byte or 8-byte Timestamp field by STA MAC hardware. This option may eliminate the rollover issues related to the separated 4-byte Timestamp field and 4-byte TSF Completion field in the Short Beacon Compatibility IE.

However, this prior art solution may have certain drawbacks. For example, this solution uses a reserved bit (e.g., bit 15) in the FC field which may be desirable to use for other features.

Accordingly, techniques for improved handling of TSF timer rollover for frames that carry the TSF timer in one or more portions are desirable.

Figure 6:
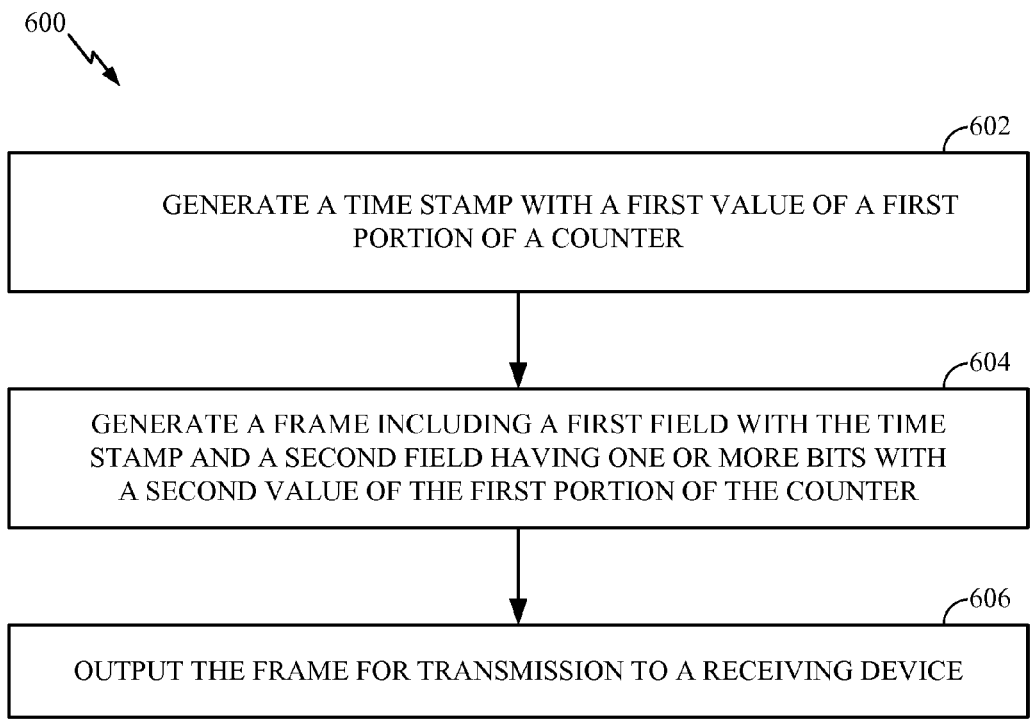
FIG. 6 illustrates a block diagram of example operations for wireless communications, in accordance with certain aspects of the present disclosure.
Figure 6A:
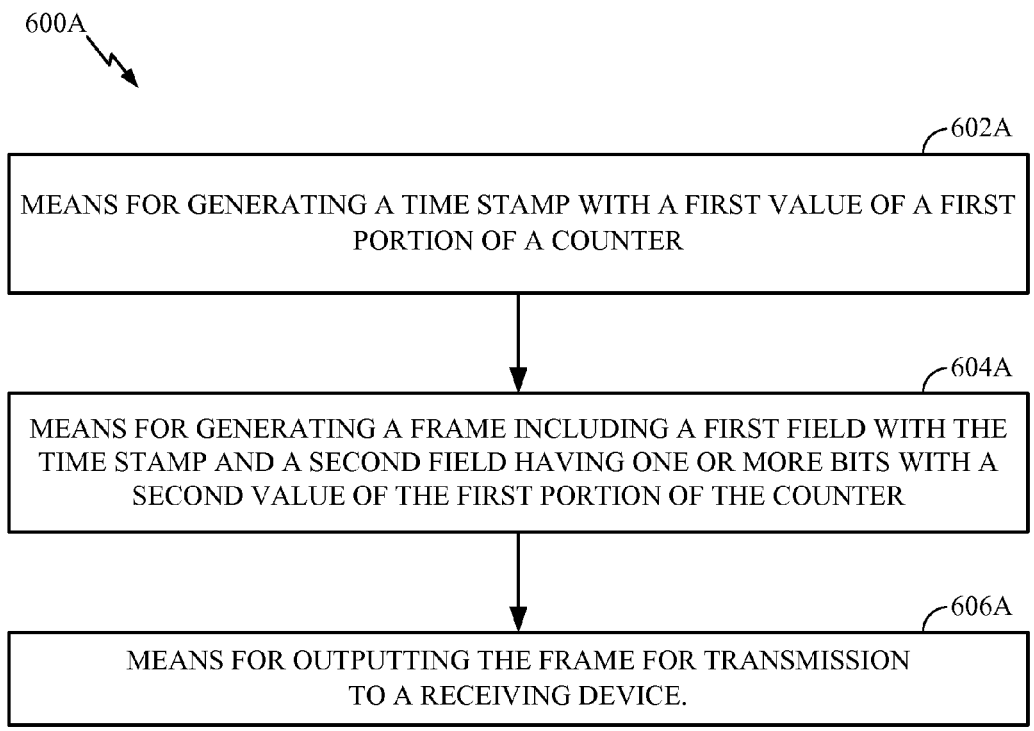
FIG. 6A illustrates example means capable of performing the operations shown in FIG. 6, in accordance with certain aspects of the present disclosure.

FIG. 6 illustrates example operations 600 for wireless communications, in accordance with certain aspects of the present disclosure. The operations 600 may be performed, for example, by an access point (AP) (e.g., AP 110). The operations 600 may begin, at 602, by generating a time stamp with a first value of a first portion of a counter. According to certain aspects, the frame may be a Short Beacon frame, S1G Beacon frame, Beacon frame, or Short Probe Response frame. According to certain aspects, the frame may be any frame that carries one or more portions of the counter. In aspects, the counter may be a Timing Synchronization Function (TSF) counter. In certain aspects the TSF counter may be called TSF timer or TSF time.

At 604, the AP may generate a frame including a first field with the time stamp and a second field having one or more bits with a second value of the first portion of the counter. According to certain aspects, the first portion of the counter may be a least significant portion of the TSF timer and the one or more bits may be a most significant bit(s) (MSB) of the least significant portion of the TSF timer. According to certain aspects, the one or more bits may be included in a Capability Information field of a Short Beacon Compatibility element (also referred to as an S1G Beacon Compatibility element) of the frame. According to certain aspects, the one or more bits may be included in any field of the element that carries the TSF Completion field that carries the most significant portion of the TSF timer (in one example below this is included in the TSF Completion field itself). According to certain aspects, these one or more bits with a second value of the first portion of the counter are called TSF Rollover Flag and may be included in a field that is named TSF Rollover Flag.

At 606, the AP may output the frame for transmission to a receiving device.

Figure 7:
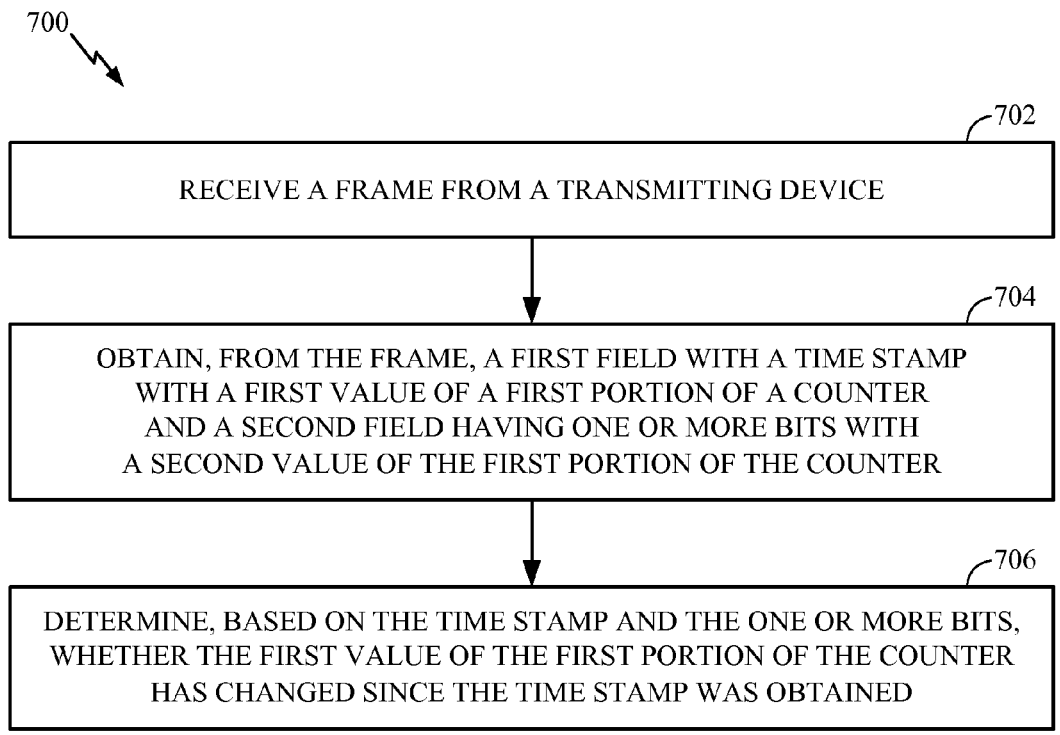
FIG. 7 illustrates a block diagram of example operations for wireless communications, in accordance with certain aspects of the present disclosure.
Figure 7A:
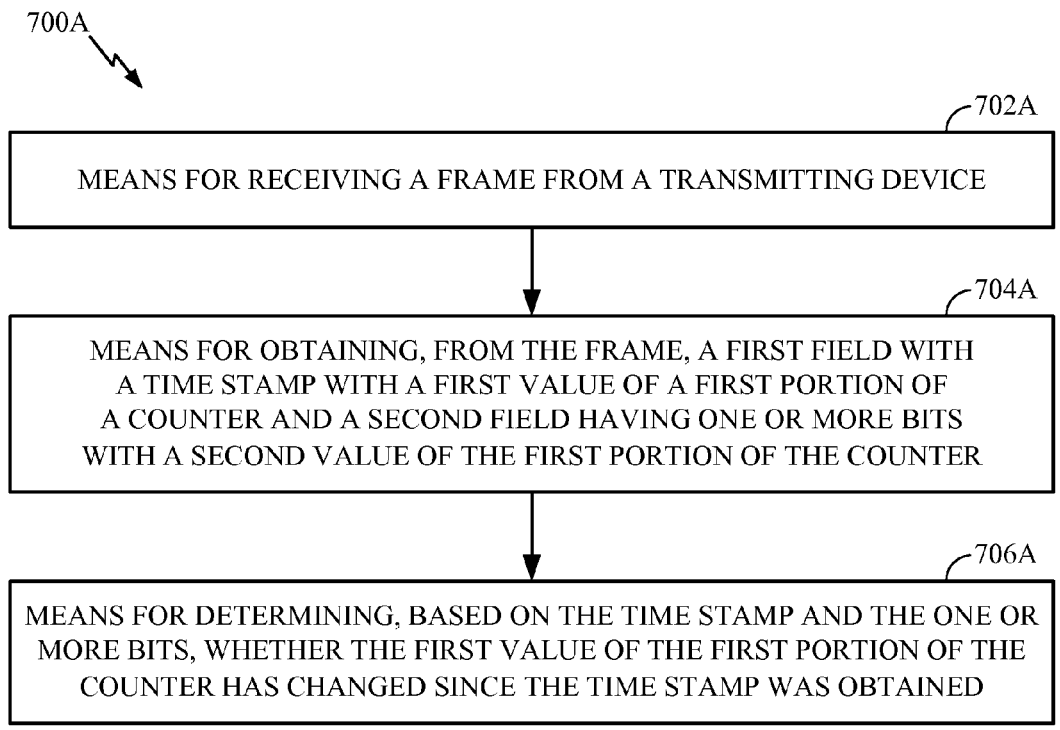
FIG. 7A illustrates example means capable of performing the operations shown in FIG. 7, in accordance with certain aspects of the present disclosure.

FIG. 7 illustrates example operations 700 for wireless communications. The operations 700 may be performed, for example, by an apparatus (e.g., user terminal 120). According to certain aspects, the operations 700 may be complementary to the operations 600 illustrated in FIG. 6. The operations 700 may begin, at 702, by receiving a frame from a transmitting device.

At 704, the user terminal may obtain, from the frame, a first field with a time stamp with a first value of a first portion of a counter and a second field having one or more bits with a second value of the first portion (i.e. the TSF Rollover Flag) of the counter.

At 706, the user terminal may determine, based on the time stamp and the one or more bits (e.g., the value of the TSF Rollover Flag), whether the first value of the first portion of the counter has changed since the time stamp was obtained (or generated). According to certain aspects, the apparatus may determine that the first portion of the counter has changed since the time the frame (or more specifically the first value of the first portion of the counter is generated) was generated if the one or more bits (e.g., the TSF Rollover Flag value) do not match corresponding bits in the adjusted Timestamp field (which accounts for processing delays at the receiving apparatus) According to certain aspects, the apparatus may update a local version of the counter based on the time stamp, the determination of whether a rollover has occurred and the value of the TSF Completion field which carries the 4 most significant octets of the TSF timer.

Figure 8:
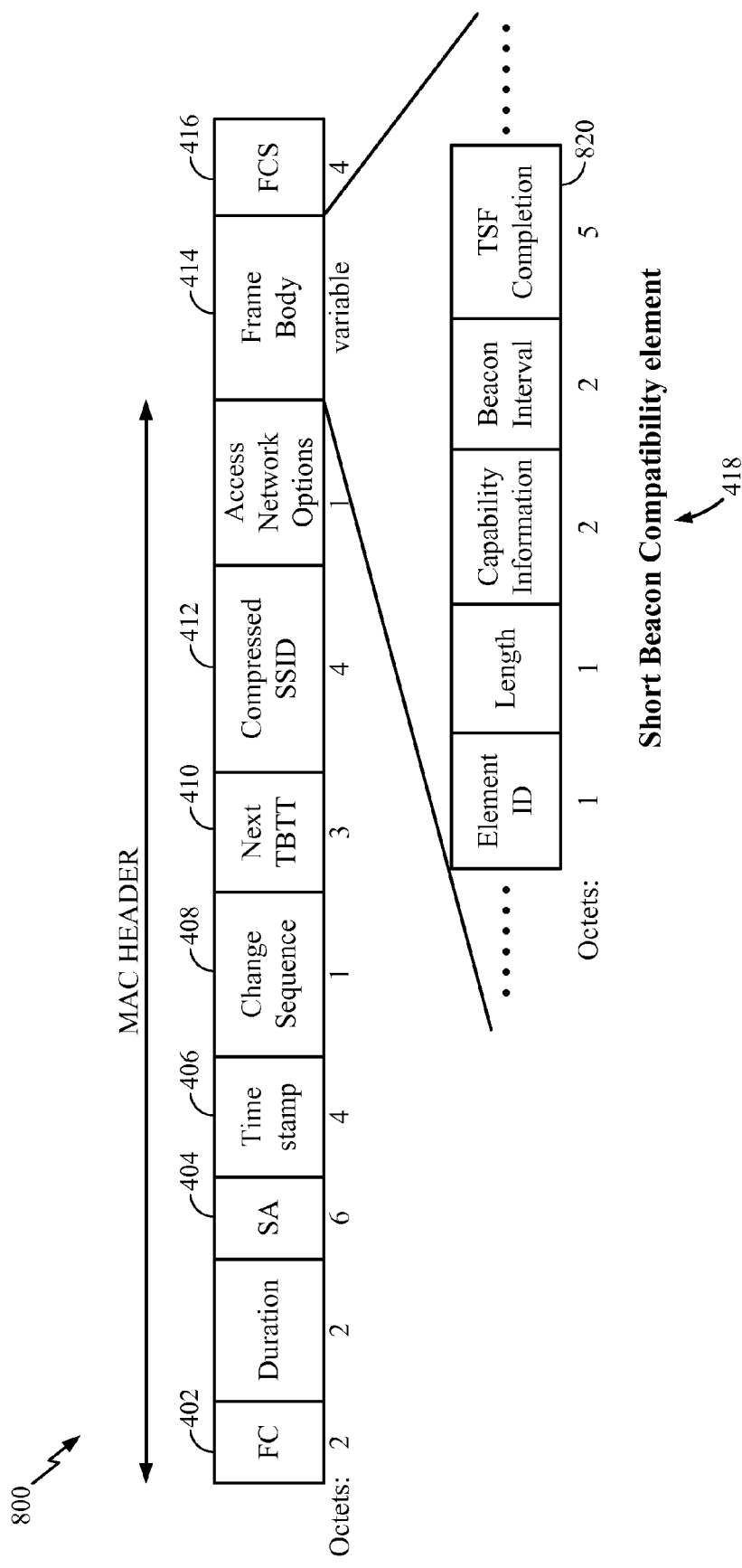
FIG. 8 illustrates a Short Beacon frame format with a 5-byte TSF Completion field, in accordance with certain aspects of the present disclosure.

As mentioned above, according to certain aspects, one solution to the TSF timer rollover problem for Short Beacon frames that include the LSBs and MSBs of the TSF timer in different portions of the frame involves increasing the size of the TSF Completion field in order to accommodate the TSF Rollover Flag. For example, as illustrated in FIG. 8, a 5-byte TSF Completion field 820 may be used in the Short Beacon frame 800 format. In this case, the TSF Completion field 820 may contain the five MSBs of the TSF timer—rather than only the four MSBs of the TSF timer. In other words, the TSF Completion field 802 contains the four MSBs of the TSF timer and also one of the four LSBs (e.g., the most significant LSB) of the TSF timer.

According to certain aspects, the STA that receives the Short Beacon frame 800 that includes a TSF timer for which a rollover has occurred may be able to identify that rollover has occurred by comparing the LSB (i.e., the TSF Rollover Flag) of the five MSBs in the TSF Completion field 820 with the same byte of the four LSBs (e.g., the most significant LSB) included in the adjusted Time Stamp Field 406 of the received Short Beacon frame 800 (which is adjusted by adding an amount equal to the receiving STA's delay through its local PHY components plus the time since the first bit of the Timestamp field was received at the MAC/PHY interface). If a rollover has occurred, the value of at least one of the bits of the TSF Rollover Flag will be different. If a rollover has not occurred, the values of all the bits of the TSF Rollover Flag in the TSF Completion field 820 should be the same as the corresponding byte of the four LSBs (e.g., the most significant LSB) of the adjusted value of the Time Stamp field 406. Hence, the receiver may identify whether a rollover has occurred by determining whether the value of the TSF Rollover Flag (first indicator) and the one or more bits of the corresponding byte (e.g., most significant) of the four LSBs (second indicator) of the adjusted Time Stamp field 406 is the same or different.

According to certain aspects, if the STA that receives the Short Beacon frame 800 identifies that a rollover has occurred (i.e., the values of the two indicators are different) the STA may then update its most significant portion of its local TSF timer based on the five MSBs included in the TSF Completion field 820 of the Short Beacon Compatibility element 418 (e.g., increased by one decimal unit)—instead of the four LSBs in Time Stamp field 406. Alternatively, if the STA identifies that a rollover has not occurred (i.e., the values of the two indicators are the same), the STA may set the most significant portion of its local TSF timer to the value of the four MSBs of the TSF Completion field 820 in the Short Beacon Compatibility element 418.

In an example implementation, upon receiving a Short Beacon frame with a valid FCS and basic service set ID (BSSID), an S1G STA may update its local TSF timer. The received Timestamp value may be adjusted by adding an amount equal to the receiving STA's delay through its local PHY components plus the time since the first bit of the Timestamp field was received at the MAC/PHY interface. If the received Short Beacon frame does not include a Short Beacon Compatibility element, the four LSBs of the STA's TSF timer may be set to the adjusted value of the Timestamp and the four most MSBs of the TSF timer may be adjusted to account for rollover (i.e., the four LSBs of the TSF timer roll over to a value less than the previous value due to processing delays at the receiver) then the equivalent decimal value of the four MSBs of the TSF timer is increased by one decimal unit. Alternatively, if the received Short Beacon frame includes a Short Beacon Compatibility element, the four LSBs of the STA's TSF timer may then be set to the adjusted value of the Timestamp. The MSB of the TSF timer may be set to the value of the four MSBs of the TSF Completion field increased by one decimal unit if the TSF Rollover flag is different from the one or more bits of the MSB of the adjusted value of the Timestamp field. However, if the TSF Rollover flag value is equal to the one or more bits of the MSB of the adjusted value of the Timestamp field, the MSB of the TSF timer may be set to the value of the TSF Completion field in the Short Beacon Compatibility IE.

According to certain aspects, the least significant portion of the TSF counter may be generated not later than the most significant portion of the TSF timer, but not earlier than $2^{31}-1$ ms before most significant portion of the TSF timer.

According to certain aspects, more than one reserved values in any element present in the frame may be used as the "flag" to indicate whether a rollover has occurred. For example, according to certain aspects, the flag may be included in the Capability Information field of the Short Beacon Compatibility IE. FIG. 9 illustrates an example of a TSF Rollover Flag subfield 914 in the Capability Information field 900 of the Short Beacon Compatibility element, in accordance with certain aspects of the present disclosure. According to certain aspects, an S1G AP may set the TSF Rollover Flag subfield 914 to the value of the most significant bits of the four LSBs of the TSF Timer at the time the element carrying the Capability Information field 900 (e.g., the Short Beacon Compatibility IE) is generated. According to certain aspects, the TSF Rollover Flag subfield 914 may be reserved for non-S1G STAs. According to certain aspects, although shown at Bit 13 in FIG. 9, the TSF Rollover Flag subfield 914 may be located in a different part of the frame, for example, at bit 6 or bit 7.

Although described herein with respect to a Beacon, the techniques described herein may also be used with respect to a Short Probe Response.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 and 700 illustrated in FIGS. 6 and 7 correspond to means 600A and 700A illustrated in FIGS. 6A and 7A.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3.

Means for processing, means for determining, means for generating, means for outputting, means for obtaining, means for increasing, means for setting, means for synchronizing, and/or means for updating may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions) described above for requesting an AID switch or responding to the same. For example, an algorithm for generating a time stamp with a first value of a first portion of a counter, to be used for synchronizing timing between the apparatus and a receiving device, an algorithm for generating a frame including a first field with the time stamp and a second field having one or more bits with a second value of the first portion of the counter, and an algorithm for outputting the frame for transmission to the receiving device. As another example, an algorithm for receiving a frame from a transmitting device, an algorithm for obtaining, from the frame, a first field with a time stamp with a first value of a first portion of a counter and a second field having one or more bits with a second value of the first portion of the counter, and an algorithm for determining, based on the time stamp and the one or more bits, whether the first value of the first portion of the counter has changed since the time stamp was obtained.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer—

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for generating a time stamp with a first value of a first portion of a counter, to be used for synchronizing timing between the apparatus and a receiving device, instructions for generating a frame including a first field with the time stamp and a second field having one or more bits with a second value of the first portion of the counter, and instructions for outputting the frame for transmission to the receiving device. As another example, instructions for receiving a frame from a transmitting device, instructions for obtaining, from the frame, a first field with a time stamp with a first value of a first portion of a counter and a second field having one or more bits with a second value of the first portion of the counter, and instructions for determining, based on the time stamp and the one or more bits, whether the first value of the first portion of the counter has changed since the time stamp was obtained.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
  a processing system configured to:
    generate a time stamp comprising a first portion of a counter; and
    generate a frame including a first field and a second field different from the first field, wherein the first field comprises the time stamp, wherein the second field comprises one or more bits associated with the first portion of the counter, wherein the second field comprises a Short Beacon Compatibility element carried in the frame, and wherein the Short Beacon Compatibility element comprises a Timing Synchronization Function (TSF) Completion field; and
  an interface configured to output the frame for transmission to a receiving device.

2. The apparatus of claim 1, wherein the frame comprises a Short Beacon frame, S1G Beacon frame, a Beacon frame, or a Short Probe Response frame.

3. The apparatus of claim 1, wherein the counter comprises a TSF counter.

4. The apparatus of claim 1, wherein:
  the first portion of the counter comprises a least significant portion of the counter; and
  the one or more bits comprise:
    one or more most significant bits associated with the least significant portion of the counter.

5. The apparatus of claim 1, wherein the Short Beacon Compatibility element carried in the frame carries a most significant portion of the counter.

6. The apparatus of claim 1, wherein:
  the TSF Completion field carries a most significant portion of the counter.

7. The apparatus of claim 1, wherein:
  the second field comprises a TSF Rollover flag included in the Short Beacon Compatibility element.

8. An apparatus for wireless communications, comprising:
  an interface configured to obtain a frame from a wireless node; and
  a processing system configured to:
    obtain, from the frame, a first field and a second field, wherein the first field comprises a time stamp having a first value of a first portion of a counter and wherein the second field comprises one or more bits having a second value of the first portion of the counter;
    compare the first value of the first portion of the counter to the second value of the first portion of the counter;
    determine, based on the comparison, whether the first value of the first portion of the counter has changed since the time stamp was obtained; and
    synchronize a timing between the apparatus and the wireless node based on the determination.

9. The apparatus of claim 8, wherein:
  the first portion of the counter comprises a least significant portion of a Timing Synchronization Function (TSF) counter; and
  the one or more bits comprise one or more most significant bits associated with the least significant portion of the TSF counter.

10. The apparatus of claim 8, wherein the processing system is configured to adjust the first value to account for a processing delay.

11. The apparatus of claim 8, wherein the second field comprises a Timing Synchronization Function (TSF) Rollover flag, and wherein the TSF Rollover flag comprises the one or more bits.

12. The apparatus of claim 8, wherein the processing system is configured to determine that the first value of the first portion of the counter has changed since the time stamp was obtained if the first value is different than the second value.

13. The apparatus of claim 12, wherein:
the second field further has a third value of a most significant portion of the counter; and
wherein the processing system is configured to synchronize the timing between the apparatus and the wireless node by:
increasing the third value; and
setting a value of one or more bits of a most significant portion of a local version of the counter equal to the increased third value.

14. The apparatus of claim 8, wherein the processing system is configured to determine that the first value of the first portion of the counter has not changed since the time stamp was obtained if the first value is the same as the second value.

15. The apparatus of claim 14, wherein:
the second field further has a third value of a most significant portion of the counter; and
wherein the processing system is configured to synchronize the timing between the apparatus and the wireless node by setting a value of one or more bits of a most significant portion of a local version of the counter equal to the third value.

16. The apparatus of claim 8, wherein the processing system is configured to synchronize the timing between the apparatus and the wireless node by updating a local version of the counter based on a third value of a most significant portion of the counter if it determines that the first value of the first portion of the counter has not changed since the time stamp was obtained.

17. The apparatus of claim 8, wherein the processing system is configured to synchronize the timing between the apparatus and the wireless node by updating a local version of the counter based on a third value of a most significant portion of the counter if it determines that the first value of the first portion of the counter has changed since the time stamp was obtained, wherein the third value is increased by the processing system before the local version of the counter is updated.

18. A method for wireless communications, comprising:
generating a time stamp comprising a first portion of a counter;
generating a frame including a first field and a second field different from the first field, wherein the first field comprises the time stamp, wherein the second field comprises one or more bits associated with the first portion of the counter, wherein the second field comprises a Short Beacon Compatibility element carried in the frame, and wherein the Short Beacon Compatibility element comprises a Timing Synchronization Function (TSF) Completion field; and
outputting the frame for transmission to a receiving device.

19. The method of claim 18, wherein the frame comprises a Short Beacon frame, S1G Beacon frame, a Beacon frame, or a Short Probe Response frame.

20. The method of claim 18, wherein the counter comprises a TSF counter.

21. The method of claim 18, wherein:
the first portion of the counter comprises a least significant portion of the counter; and
the one or more bits comprise:
one or more most significant bits associated with the least significant portion of the counter.

22. The method of claim 18, wherein the Short Beacon Compatibility element carried in the frame carries a most significant portion of the counter.

23. The method of claim 18, wherein:
the TSF Completion field carries a most significant portion of the counter.

24. The method of claim 18, wherein:
the second field comprises a TSF Rollover flag included in the Short Beacon Compatibility element.

25. A method for wireless communications by an apparatus, comprising:
obtaining a frame from a wireless node;
obtaining, from the frame, a first field and a second field, wherein the first field comprises a time stamp having a first value of a first portion of a counter and wherein the second field comprises one or more bits having a second value of the first portion of the counter;
comparing the first value of the first portion of the counter to the second value of the first portion of the counter;
determining, based on the comparison, whether the first value of the first portion of the counter has changed since the time stamp was obtained; and
synchronizing a timing between the apparatus and the wireless node based on the determination.

26. The method of claim 25, wherein:
the first portion of the counter comprises a least significant portion of a Timing Synchronization Function (TSF) counter; and
the one or more bits comprise one or more most significant bits associated with the least significant portion of the TSF counter.

27. The method of claim 25, further comprising adjusting the first value to account for a processing delay.

28. The method of claim 25, wherein the second field comprises a Timing Synchronization Function (TSF) Rollover flag, and wherein the TSF Rollover flag comprises the one or more bits.

29. The method of claim 25, wherein the determination is that the first value of the first portion of the counter has changed since the time stamp was obtained if the first value is different than the second value.

30. The method of claim 29, wherein:
the second field further has a third value of a most significant portion of the counter; and wherein synchronizing the timing between the apparatus and the wireless node comprises:
increasing the third value; and
setting a value of one or more bits of a most significant portion of a local version of the counter equal to the increased third value.

31. The method of claim 25, wherein the determination is that the first value of the first portion of the counter has not changed since the time stamp was obtained if the first value is the same as the second value.

32. The method of claim 31, wherein:
the second field further has a third value of a most significant portion of the counter; and wherein synchronizing the timing between the apparatus and the wireless node comprises setting a value of one or more bits of a most significant portion of a local version of the counter equal to the third value.

33. The method of claim 25, wherein synchronizing the timing between the apparatus and the wireless node comprises updating a local version of the counter based on a third value of a most significant portion of the counter if the determination is that the value of the first portion of the counter has not changed since the time stamp was obtained.

34. The method of claim 25, wherein synchronizing the timing between the apparatus and the wireless node comprises updating a local version of the counter based on a third value of a most significant portion of the counter if the determination is that the first value of the first portion of the counter has changed since the time stamp was obtained, wherein the third value is increased by the apparatus before the local version of the counter is updated.

35. An apparatus for wireless communications, comprising:
means for generating a time stamp comprising a first portion of a counter;
means for generating a frame including a first field and a second field different from the first field, wherein the first field comprises the time stamp, wherein the second field comprises one or more bits associated with the first portion of the counter, wherein the second field comprises a Short Beacon Compatibility element carried in the frame, and wherein the Short Beacon Compatibility element comprises a Timing Synchronization Function (TSF) Completion field; and
means for outputting the frame for transmission to a receiving device.

36. The apparatus of claim 35, wherein the frame comprises a Short Beacon frame, S1G Beacon frame, a Beacon frame, or a Short Probe Response frame.

37. The apparatus of claim 35, wherein the counter comprises a TSF counter.

38. The apparatus of claim 35, wherein:
the first portion of the counter comprises a least significant portion of the counter; and
the one or more bits comprise:
one or more most significant bits associated with the least significant portion of the counter.

39. The apparatus of claim 35, wherein the Short Beacon Compatibility element carried in the frame carries a most significant portion of the counter.

40. The apparatus of claim 35, wherein:
the TSF Completion field carries a most significant portion of the counter.

41. The apparatus of claim 35, wherein:
the second field comprises a TSF Rollover flag included in the Short Beacon Compatibility element.

42. An apparatus for wireless communications, comprising:
means for obtaining a frame from a wireless node;
means for obtaining, from the frame, a first field and a second field, wherein the first field comprises a time stamp having a first value of a first portion of a counter and wherein the second field comprises one or more bits having a second value of the first portion of the counter;
means for comparing the first value of the first portion of the counter to the second value of the first portion of the counter;
means for determining, based on the comparison, whether the first value of the first portion of the counter has changed since the time stamp was obtained; and
means for synchronizing a timing between the apparatus and the wireless node based on the determination.

43. The apparatus of claim 42, wherein:
the first portion of the counter comprises a least significant portion of a Timing Synchronization Function (TSF) counter; and
the one or more bits comprise one or more most significant bits associated with the least significant portion of the TSF counter.

44. The apparatus of claim 42, further comprising means for adjusting the first value to account for a processing delay.

45. The apparatus of claim 42, wherein the second field comprises a Timing Synchronization Function (TSF) Rollover flag, and wherein the TSF Rollover flag comprises the one or more bits.

46. The apparatus of claim 42, wherein the means for determining determines that the first value of the first portion of the counter has changed since the time stamp was obtained if the first value is different than the second value.

47. The apparatus of claim 46, wherein:
the second field further has a third value of a most significant portion of the counter; and wherein the means for synchronizing the timing between the apparatus and the wireless node comprises:
means for increasing the third value; and
means for setting a value of one or more bits of a most significant portion of a local version of the counter equal to the increased third value.

48. The apparatus of claim 42, wherein the means for determining determines that the first value of the first portion of the counter has not changed since the time stamp was obtained if the first value is the same as the second value.

49. The apparatus of claim 48, wherein
the second field further has a third value of a most significant portion of the counter; and wherein the means for synchronizing the timing between the apparatus and the wireless node comprises means for setting a value of one or more bits of a most significant portion of a local version of the counter equal to the third value.

50. The apparatus of claim 42, wherein the means for synchronizing the timing between the apparatus and the wireless node comprises means for updating a local version of the counter based on a third value of a most significant portion of the counter if it is determined that the first value of the first portion of the counter has not changed since the time stamp was obtained.

51. The apparatus of claim 42, wherein the means for synchronizing the timing between the apparatus and the device comprises means for updating a local version of the counter based on a third value of a most significant portion of the counter if it is determined that the first value of the first portion of the counter has changed since the time stamp was obtained, wherein the third value is increased by the apparatus before the local version of the counter is updated.

52. A non-transitory computer readable medium having instructions stored thereon for:
generating a time stamp comprising a first portion of a counter;
generating a frame including a first field and a second field different from the first field, wherein the first field comprises the time stamp, wherein the second field comprises one or more bits associated with the first portion of the counter, wherein the second field comprises a Short Beacon Compatibility element carried in the frame, and wherein the Short Beacon Compatibility element comprises a Timing Synchronization Function (TSF) Completion field; and
outputting the frame for transmission to a receiving device.

53. A non-transitory computer readable medium having instructions stored thereon for:
- obtaining a frame from a wireless node;
- obtaining, from the frame, a first field and a second field, wherein the first field comprises a time stamp having a first value of a first portion of a counter and wherein the second field comprises one or more bits having a second value of the first portion of the counter;
- comparing the first value of the first portion of the counter to the second value of the first portion of the counter;
- determining, based on the comparison, whether the first value of the first portion of the counter has changed since the time stamp was obtained; and
- synchronizing a timing between an apparatus receiving the frame and the wireless node based on the determination.

54. An access point (AP), comprising:
- a processing system configured to generate a time stamp comprising a first portion of a counter and generate a frame including a first field and a second field different from the first field, wherein the first field comprises the time stamp, wherein the second field comprises one or more bits associated with the first portion of the counter, wherein the second field comprises a Short Beacon Compatibility element carried in the frame, and wherein the Short Beacon Compatibility element comprises a Timing Synchronization Function (TSF) Completion field; and
- a transmitter configured to transmit the frame.

55. A station, comprising:
- a receiver configured to receive a frame from a wireless node; and
- a processing system configured to:
  - obtain, from the frame, a first field and a second field, wherein the first field comprises a time stamp having a first value of a first portion of a counter and wherein the second field comprises one or more bits having a second value of the first portion of the counter;
  - compare the first value of the first portion of the counter to the second value of the first portion of the counter;
  - determine, based on the comparison, whether the first value of the first portion of the counter has changed since the time stamp was obtained; and
  - synchronize a timing between the station and the wireless node based on the determination.

* * * * *